United States Patent [19]
Altham et al.

[11] Patent Number: 5,146,544
[45] Date of Patent: Sep. 8, 1992

[54] PRINTER CONTROL DEVICE

[76] Inventors: David R. Altham, 98 Norroy Road, Putney, London, United Kingdom, SW15 1PG; Andrew P. Prince, 10 Shepherd's Bush Place, London, United Kingdom, W12 8LX

[21] Appl. No.: 603,683
[22] PCT Filed: May 3, 1989
[86] PCT No.: PCT/GB89/00468
§ 371 Date: Oct. 31, 1990
§ 102(e) Date: Oct. 31, 1990
[87] PCT Pub. No.: WO89/11132
PCT Pub. Date: Nov. 16, 1989

[30] Foreign Application Priority Data

May 3, 1988 [GB] United Kingdom ............... 8810387

[51] Int. Cl.$^5$ .......................................... G06K 15/00
[52] U.S. Cl. ..................................... 395/115; 395/101
[58] Field of Search ......................... 364/518–520, 364/235 MS File, 230 MS File; 400/68, 61, 62, 76; 395/101, 112, 114; 346/154

[56] References Cited

U.S. PATENT DOCUMENTS

| | | | |
|---|---|---|---|
| 3,810,109 | 5/1974 | Morris, et al. | 340/172.5 |
| 4,085,445 | 4/1978 | Blevins et al. | 364/900 |
| 4,960,338 | 10/1990 | Sheldon | 400/636.1 |

FOREIGN PATENT DOCUMENTS

| | | | |
|---|---|---|---|
| 0132782 | 7/1984 | European Pat. Off. | 364/519 |
| 0142032 | 10/1984 | European Pat. Off. | 364/519 |
| A2 025077 | 5/1987 | European Pat. Off. | 364/519 |
| 0249495 | 6/1987 | European Pat. Off. | 364/519 |
| WO86/04703 | 2/1986 | PCT Int'l Appl. | 364/519 |
| WO86/05294A2 | -2/1986 | PCT Int'l Appl. | 364/519 |
| 1044294 | 4/1963 | United Kingdom | 364/519 |
| 1233087 | 7/1968 | United Kingdom | 364/519 |
| 1536383 | 5/1977 | United Kingdom | 364/519 |

*Primary Examiner*—Arthur G. Evans
*Attorney, Agent, or Firm*—McAndrews, Held & Malloy Ltd.

[57] ABSTRACT

This patent discloses a dedicated printer control device having at least one input port through which text data is received and an output port means for connection to a printer. The printer control device includes means for designating characters as control codes by which beginning and end of data may be identified. Data so identified may be printed separately. The printer control device further includes a means for recognizing control codes and user operable selection means for selectively directing identified data, to the output port means for separate printing. The printer control device also includes a means for modifying the format of the identified data that is identified and separately printed. In one embodiment of the present invention, the printer control device includes a means for converting at least a part of the identified data into bar code form and transmitting the bar code form to the output port means. The output port means may have two or more output ports to which text data and identified data may be selectively transmitted.

22 Claims, 4 Drawing Sheets (continuation)

PRINTER CONTROL DEVICE

BACKGROUND OF THE INVENTION

The present invention relates to the control of printing operations on text data produced by a word processor or by a computer running a word processing programme. The device is intended to be connected between an output port of a word processor or computer and an input port of a printer.

In most office situations, where a word processor is being used to prepare letters, it is necessary to print not only the letter but an envelope or label for such an envelope containing the address data which is usually to be found embedded in the text data of the letter. In order to produce both the letter and label or envelope, a secretary normally has to produce two separate documents and carry out two separate printing operations. Some specialist word processing software provides facilities for printing address labels. However, this is normally limited to "mail merge" type programmes which are intended for producing large numbers of similar letters to addresses selected from a database. In such applications, the label or envelopes are printed altogether as a separate print run. The secretary who produces a number of different letters on a word processor usually finds it necessary to resort to a typewriter to prepare the envelopes required. This results in a considerable expenditure of time and detracts considerably from the efficiency that is otherwise available from the use of a word processor.

SUMMARY OF THE INVENTION

According to a first aspect of this invention, a dedicated printer control device comprises at least one input port for receiving text data, a first output port for connection to a printer on which the text data is to be printed, means for designating characters as control codes identifying the beginning and end respectively of a part of the data, which part is to be separately printed, means for recognising the or each control code in the input text data, user operable selection means for selectively directing the identified part of the text data to a second or third printer output port for the said separate printing, and means for modifying the format of the said part of the text data applied to the second or third output port whereby the device is operable automatically to feed all of the text data to be printed, including the said part, to the first output port for a first printing operation, and the said part to the second or third output ports for a separate, second printing operation.

With such a device it is possible to connect the main printer to the first output port and an auxiliary printer to the second printer output port. The auxiliary printer can be loaded with envelopes or labels so that the address data identified between the control codes is not only sent to the main printer as part of the letter or other document but also to the auxiliary printer for preparation of the required envelope at the same time as the letter is being printed. This results in time saving and also avoids the need for the secretary to type the address data twice. The auxiliary printer may preferably be integral with the device thereby producing a device which merely needs to be connected into the cable from a word processor to a printer and which requires no further modification of the system. In an alternative version a third printer output port may be provided. The address data may be output at the second and third ports in different preset formats for use by a label or envelope printer respectively.

The designating means is preferably a keyboard associated with the device by means of which the characters to be used as control codes may be changed. The designating means may comprise a memory in the device in which default characters are stored. The control codes are characters which may be inserted in the document to be printed by the word processor operator at the appropriate place. Typically they will be characters which are not frequently used in normal correspondence, for example "/, *, ∧, or ~". These characters are called printable control codes because they act as control codes in the sense that they are recognised by the device for the purposes of initiating a control function, in this case starting or stopping the process of diversion of data to an auxiliary printer at the same time as it is being presented to the first output port. Yet, unlike the usual control codes used to send signals to a printer, they are also printable characters. It is envisaged that the characters selected as control codes will be any of the 256 designated ASCII characters not all of which are associated with a character that can be displayed on all screens or printers. However, with most computer systems it is relatively easy to enter any such character from the keyboard. Since these control codes are printable, the device preferably further comprises selectively operable means to strip them out of the data transmitted to the main printer in order that they should not appear in the principle document.

In the preferred embodiments the device is operable in a number of different modes which can be selected from a keyboard. Modes which may be provided include a mode where the operation of the device is effectively disabled and all input data is sent directly to the first output port, a mode in which the printable control codes are identified and stripped out of the data sent to the first output port and the data identified by the codes is sent to the second output port. Other possible modes provide for printing only of the identified data, or printing only of the primary data without the printable control codes, or reversion to the direct throughput mode after printing of a single document using both the first and second output port.

In one embodiment which is described with reference to FIG. 2 of the drawings the device does not require a central processing unit and software programme but is implemented with a ROM look up table and comparator to provide the means for recognising the control codes.

An alternative embodiment of the device may also perform other additional functions beyond those already described, such as, for example, print spooling or graphics driving for the printers on the auxiliary output ports. This embodiment uses a programmed Central Processing Unit (CPU) to perform all the data processing and peripheral device handling tasks.

The invention also includes, according to a second aspect thereof, a dedicated printer control device for use with a computer system comprising means for outputting text data and at least tow printers, the device having an input port for receiving said text data and respective output ports for connection to the two or more printers, the device further comprising means for recognising control codes in the input text data identifying the beginning and end respectively of a part of the text data to be separately printed and, in response to recognition thereof, transmitting the text data to one or both or more of said printer output ports in similar and/or selectively modified formats concurrently on different output ports, the device being arranged, in at least one of its modes of operation, automatically to feed all of the text data to be printed, including the said part, to one of the output ports, for a first printing operation, and the said part to another of the output ports for a separate second printing operation.

BRIEF DESCRIPTION OF THE DRAWINGS

Two embodiments of the device will now be described, by way of example only, with reference to the accompanying diagrammatic drawings, in which.

DESCRIPTION OF THE PREFERRED EMBODIMENTS

Figure 1:
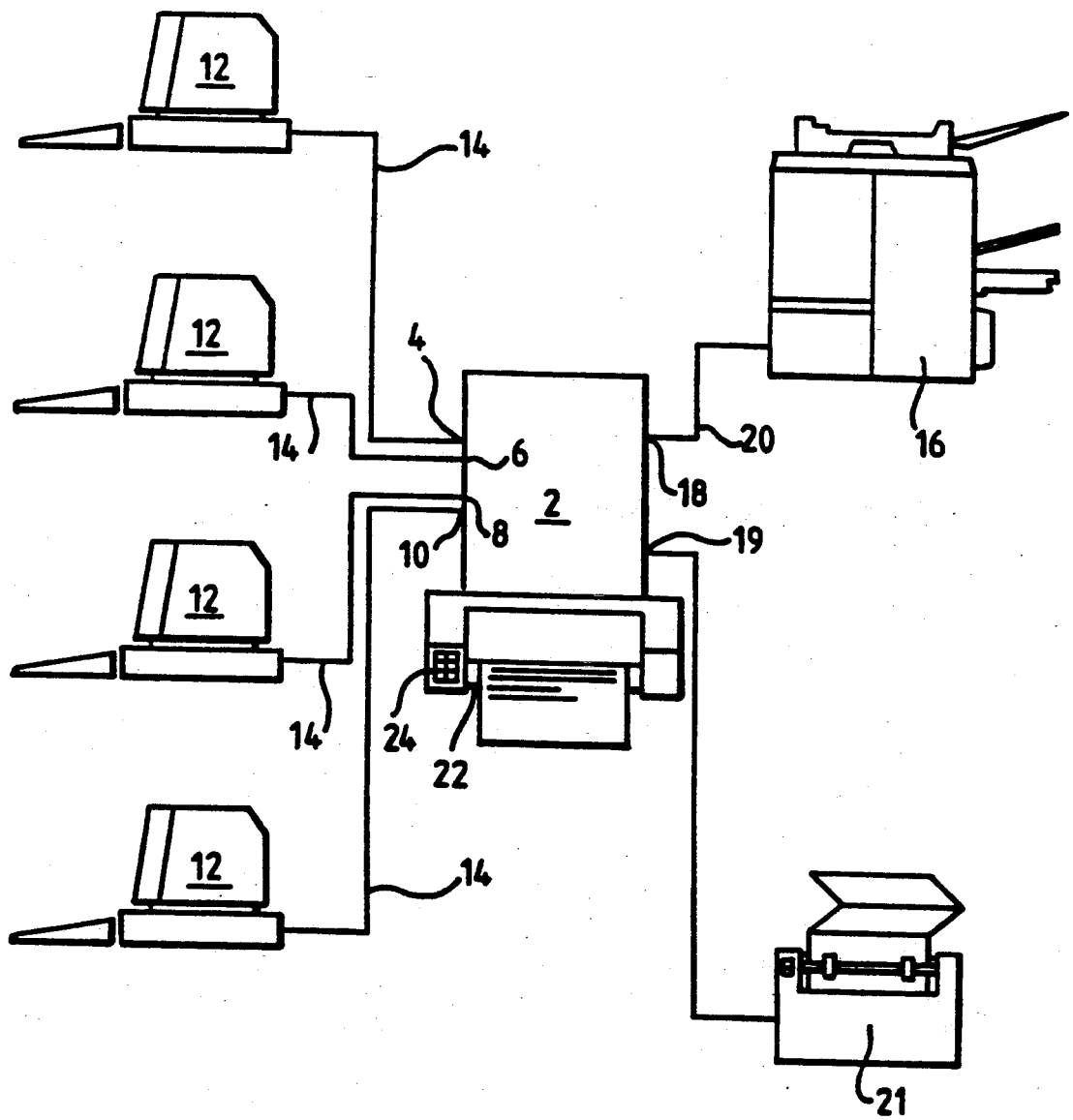
FIG. 1 is a diagram illustrating how the device is incorporated into a word processing network.

As shown in FIG. 1 the printer control device 2, is provided with one or more input ports, (four input ports 4, 6, 8, 10 are shown) to which word processor terminals 12 are connected by means of cables 14. Each word processor terminal or microprocessor is capable of producing output text data on its respective output cable. This data is required to be in a synchronous form and will normally consist of a stream of ASCII characters representing printable text and non-printable control codes for controlling function such as line feed, carriage return etc. of a printer 16. The output of the terminals may be in either serial or parallel format.

The device 2 has a first output port 18 which is connected to the main printer 16 by means of a cable 20. This cable 20 may carry the data in serial or parallel format depending on the format of the input data. The device 2 also has a second output port connected to an auxiliary label printer 21. In the present case an integral envelope printer 22 is also shown but this may be replaced by a third output port to which such a printer may be connected by means of a cable.

The device 2 is also provided with a matrix type keypad 24 which is used to input data needed to control the operation of the device. Text data from only one terminal can be sent to the printer at any time so the keypad 24 is used to input the channel which is to be active where more than one input is implemented, that is which of terminals 12 is to have access to the printer 16. The keypad is also used to enter the mode of operation of the device which will be explained in more detail later. The keypad 24 also allows the printable control codes to be designated. The keypad is a convenient means of allowing the operator to modify the operation of the device quickly but it will be appreciated that all the required parameters of the device may be preset so that the keypad is not essential to the functioning of the device. The keypad may have any appropriate configuration and other types of input means may be used for this purpose though a matrix keypad is preferred for reason of its low maintenance and low cost.

Figure 2:
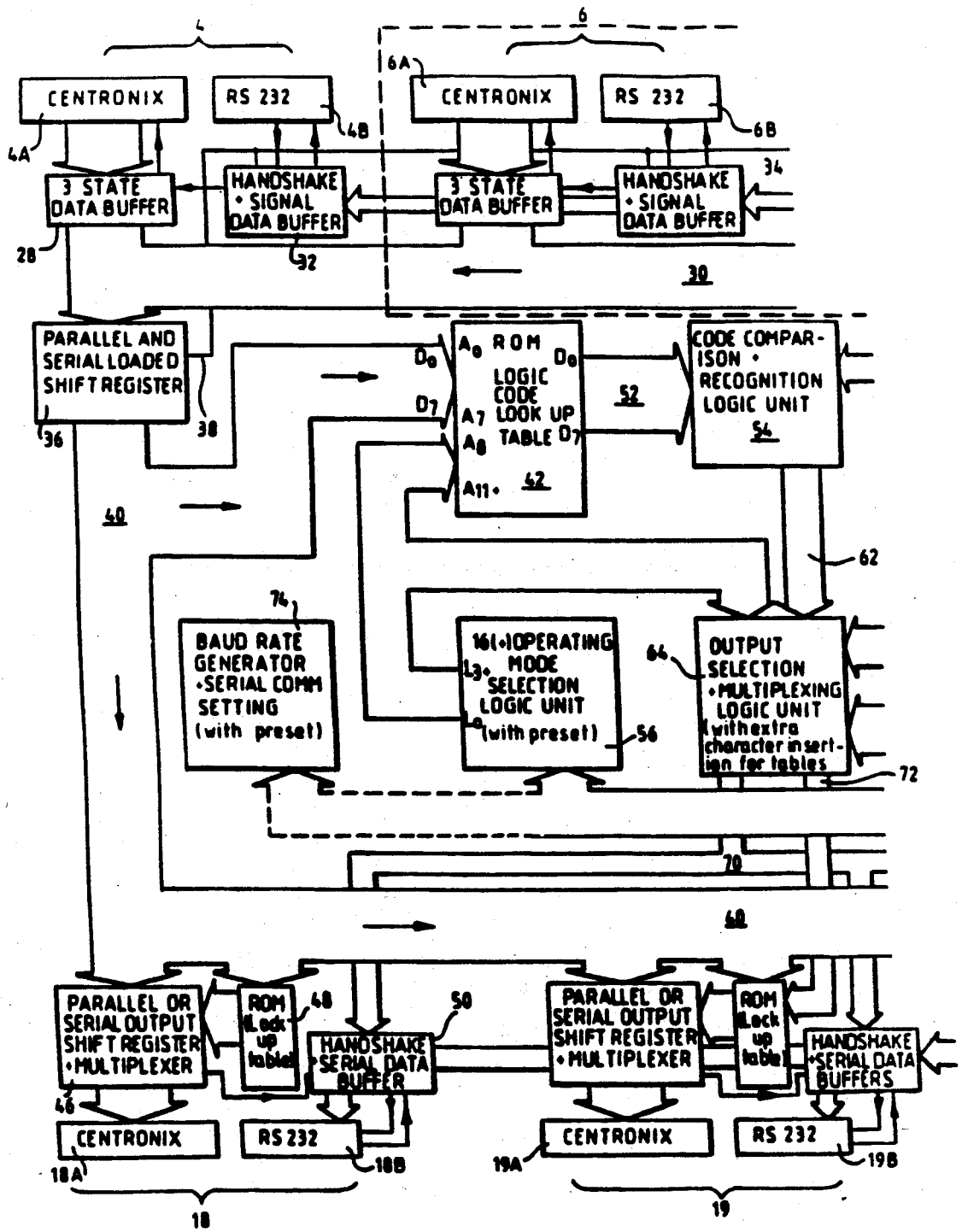
FIG. 2 is a block diagram showing the construction of the device implemented with a ROM look-up table and comparator.
Figure 2:
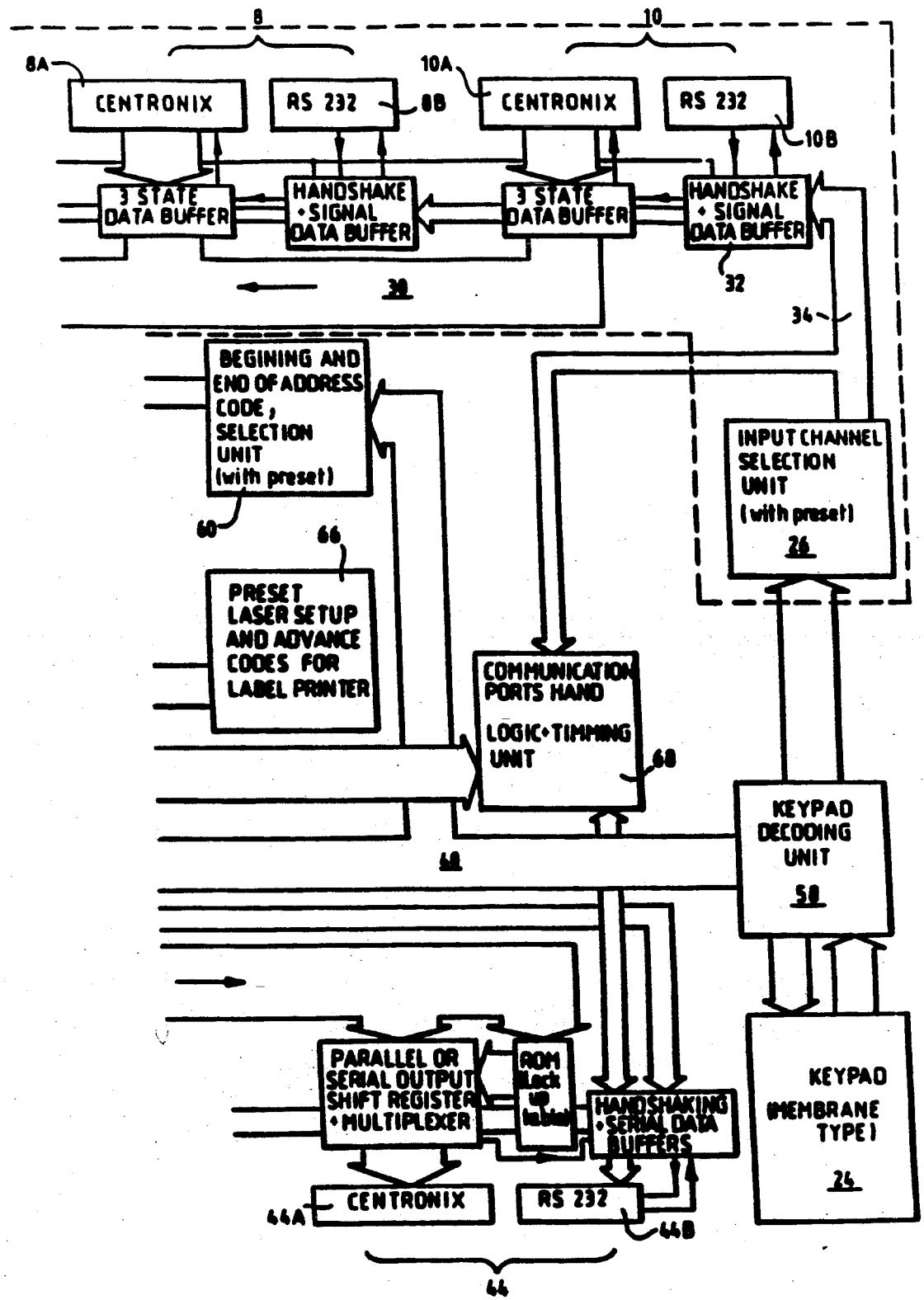

The internal structure of one embodiment of the device 2 is shown in more detail in FIG. 2 which will now be described.

Each of the input ports 4, 6, 8, 10 has two alternative input connectors, one 4A for a parallel format input, for example a CENTRONIX (Trade Mark) input, and one 4B for a serial format input, for example an RS232 input. The input ports 8, 10 and 12 and an associated input channel selection unit 26, which is controlled from keypad 24, may be omitted if only one terminal 12 is to be connected to the main printer 16. The CENTRONIX (Trade Mark) or parallel connectors 4A, 6A, 8A, 10A are each directly connected to a respective 3-state data buffer 28. The outputs of each such buffer are fed to a data bus 30. The serial connectors 4B, 6B, 8B, 10B are each connected to a respective handshake and serial data buffer 32, the output of which is connected by the associated 3-state data buffer 28 for that channel to the data bus 30. Only the buffer 32 for the channel which is active will function as controlled by an input on bus 34 from the input channel selection unit 26. Therefore, regardless of the format of the selected input the data output from the selected terminal is made available on the data bus 30 and is fed to an input of a shift register/latch 36. This shift register 36 also receives an input directly on a line 38 which is connected to each of the serial data buffers 32. The inputs received from the data bus 30 and the line 38 ensure that the output from the register 36 represents the characters and codes of the data stream in parallel format on bus 40. The signal received on the line 38 when the input data is in serial format causes register 36 to assemble the bits associated with a single printable character or control code before outputting them on bus 40. For a parallel input these bits will be received at the same time and there will be no input on line 38. The arrangement described in a universal a synchronous receiver with selectable input channels.

The bus 40 presents the data stream in this parallel format to the output ports and to the input of a ROM look up table 42. In the present example three output ports 18,19,44 are shown. At each output port the data bus 40 is connected to a parallel or serial output shift register and multiplexer 46 and also to a ROM look up table 48. As at the input ports each of the three output ports is capable of operating either as a serial or a parallel port. Accordingly each port is provided with a parallel output connector 18A, 19A, 44A which is connected directly to the corresponding output shift register 46, and also a serial output connector 18B, 19B, 44B which is connected to the corresponding output shift register 46 via a handshake and serial data buffer 50. The first output port 18 is for the connection to the main printer 16. The second output port 19 is provided for connection to a label printer and the third port is for connection to an envelope printer. Either the label or envelope printer may be an integral printer in which case the connectors of ports 19 and 44 may be replaced by a single hard wired connection of the appropriate format. The components at the output ports operate to convert the parallel data from bus 40 into the appropriate format for transmission to the required connector in a conventional manner. The function of the ROM look up table 48 is to allow format and control settings to be input into the output data. The use of a ROM allows the settings to be changed and permanent connections may be used if desired.

The data bus 40 is also connected to eight of the address lines of the ROM look up table 42. The ROM data output lines 52 of this table are used to supply a simple identification code, which is dependent upon the input character, to a code comparison unit 54. The function of the ROM look up table 42 and its associated code comparison unit 54 is to recognise the specific printable control codes which are being used to identify the address data within the text data of a document. The ROM 46 may contain various different versions of the look up table in dependence upon the mode of operation of the device as et by the keypad 24. The version of the look up table to be employed at any instant is identified by the input on the other address lines of the ROM 42. The additional address input is provided from an operation mode selection logic unit 56 which is controlled from the output of a decoding unit 58 connected to the keypad 24. Because the printable control codes cannot reasonably be the normal alphanumeric characters the codes which are output from the look up table do not need to distinguish between such characters. Therefore the output codes can be of considerably fewer bits than the input 8 bit ASCII characters. Nevertheless it is necessary for each version of the look up table to be 256 bytes long to correspond to the complete ASCII characters set. The use of this ROM look up table containing identification codes enables the entire device to operate without the use of a central processing unit or programme.

The code comparison logic unit 54 receives another input from a code selection unit 60 which is fed from the kaypad decoding unit 58. At least tow printable control codes are required for operation of the device. These are a 'begin' code which is inserted in the text to identify the beginning of address data and an 'end' code which is inserted into the text at the end of the address data. It may also be necessary to provide for an 'intermediate end' code to identify the end of address data in that line of text but indicate that the address data continues in the succeeding line as the 'end' of address code has not yet been reached. A code selection unit 60 outputs to the code comparison unit the identification codes of the printable control codes presently being used as set from the keypad or the preset codes. These identification codes are then compared with the input identification codes representing the input data stream and outputs are produced on a data bus 62, which is connected to an output selection and multiplexing logic unit 64, whenever a control code is recognised. This logic unit 64 also receives inputs in dependence upon the operating mode from the operating mode selection logic unit 56, from a preset label set up unit 66, and from a communication ports handshake logic and timing unit 68, which controls the output timing of the outputs from the logic unit 64. The logic unit 64 has an output 70 which is connected to the handshake and serial buffers 50 of each of the output ports. The logic unit 64 also has an output 72 which is connected directly to the ROM look up table 48 of the second output port 19 for the label printer. This connection provides for activation of this output port on recognition of a 'begin' code and for the necessary additional spaces and line feeds required to print the address data in the correct position on the label. The output port 19 is then disabled on recognition of the 'end' code and temporarily disabled by an 'intermediate end' code. The required additional characters are determined by the preset parameters set up in the unit 64.

The third output port 44 is also controlled from the logic unit 64 by a connection (not shown) in a similar manner to the second output port.

A baud rate generator and serial communications settings unit 74 may also be provided to allow the rates of operation of the various output ports to be selectively set as required by the printers connected to them. This unit 74 has connections (now shown) to the output ports and receives its input from the keypad 24 via the decoding unit 58. The unit has values preset into it. It will be appreciated that since much less data has to be output through the second or third ports it is possible to employ much slower printers at these ports.

The device operates as follows:

The matrix keypad 24 is used for setting the various information before operation of the device. Preset default values for all this information are provided so that the operator does not necessarily need to access the keypad before each printing or other operation if the default values or previously set values are acceptable. The information which can be set includes:

(i) the input port which is to be employed;
(ii) the 'begin' code character, the 'end' code character and any 'intermediate end' code characters; and
(iii) the mode of operation.

The mode of operation may be selected from the following modes which are listed by way of example. It will be appreciated that further modes may be provided if there is a need for them.

1. Direct Throughput to Printer Mode

In this mode the data from the selected input port is fed directly to the main output port 18 without any alteration. Although the ROM look up table 42 will continue to function in this mode its output will not be employed. In this mode a null version of the look up table may be selected by the address lines controlled by the operating mode selection logic unit 56.

2. Direct Throughput with Printable Control Code Stripping Mode

In this mode the printable control codes are removed and replaced by spaces in the data for printing by the main printer but otherwise no outputs are provided at the second and third output ports. In this mode of operation the control codes must be recognised by the code comparison recognition logic unit 54 which, via the output logic unit 64 and output 70, controls the replacement of these codes with space characters.

3. Single Shot Envelope Printing Mode

In this mode the address data identified as being between 'begin' and 'end' codes is printed out to an envelope printer connected to the third output port 44 while the text of the letter is being printed out by the main printer connected to first output port 18. The output at port 18 is identical to that produced in the previously described mode. In addition the third output port is activated by a 'begin' code and prints the address data onto an envelope. The operating mode selection logic unit 56 resets the output logic unit 64 after the document has been printed so that the device reverts to mode 1.

4. Automatic Envelope Printing Mode

This mode is identical to mode 3 accept that the device remains in this mode to print a series of letters and associated envelopes.

5. No Letter Printing Single Shot Envelope Printing Mode

This mode is identical to mode 3 accept that the output from the first output port is disabled so that the letter itself is not printed and only an envelope is printed.

6. Automatic No Letter Printing Envelope Mode

This mode is the same as mode 4 but in this case the output from the first output port is disabled. In this mode a series of envelopes will be printed.

7. Label Printing Modes

Label printing modes corresponding to modes 3–6 described above may be provided. In these modes labels will be printed on a printer connected to the second output port 19. For label printing additional spaces and characters as required for the format of the labels are incorporated into the address data at positions in the data stream identified by the various printable control codes.

Figure 3:
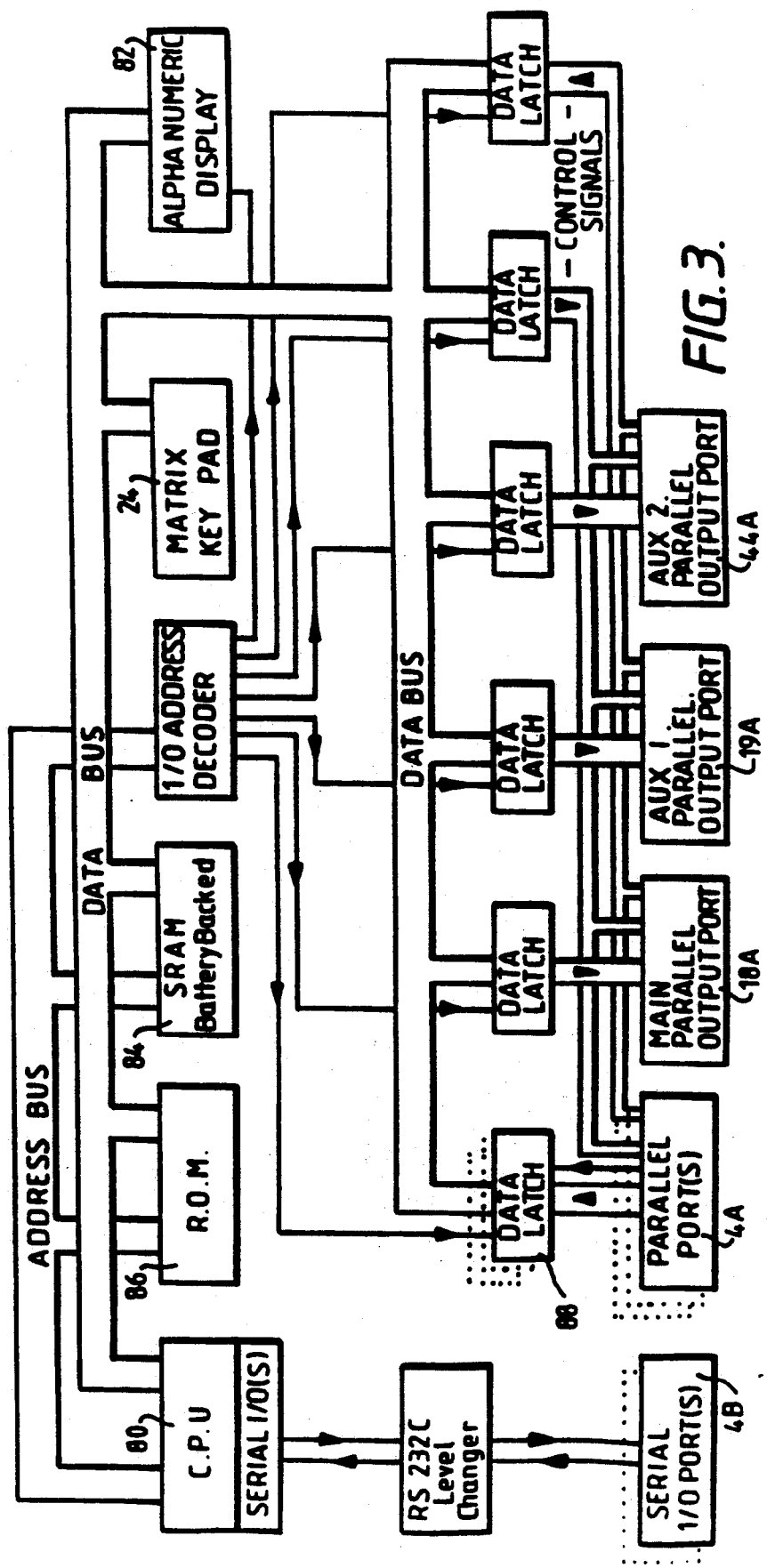
FIG. 3 is a block diagram showing the construction of the device implemented with a CPU.

An alternative embodiment using a CPU will now be described with reference to FIG. 3. This device provides all the same operating modes as the device described with reference to FIG. 2. Identical reference numerals in FIGS. 2 and 3 indicate equivalent parts. However, in this embodiment a CPU 80 controls the data flow between the input ports, which may be parallel 4A or serial 4B, and the three output ports shown in 18A, 19A and 44A. The matrix kaypad 24 is associated with an alphanumeric display 82 such as an LCD or an LED display mounted in the housing of the device adjacent the keypad 24.

The matrix keypad 24 used with this device may be a 4×4 matrix kaypad with ten numeric keys, four cursor keys, an "Enter" key and a "Reset" key. With this type of keypad the four cursor keys enable the user to select from options presented on the display 82. The CPU 80 controls the operation of the display in order to show the various options available to the user sequentially. These options are presented one at a time either forwards or backwards through the sequence depending on which of the cursor keys is depressed. The options available for display in the window are either the various "operating mode" options, or 'configuration' options. The display of the current operating mode is the default display. The keypad can be used in a "user programming mode" to set up the various 'configuration' options. In this mode the CPU runs a programme routine which allows the user to set up the device by selecting a number of options. Such 'configuration' options include the ASCII characters to be used as the 'begin' and 'end' codes, the ports which are to be used, the types of printer connected to each port, the baud rates to be used by each port, and the communications protocol. Other settings can also be determined according to the application of the device. Each option is selected from a sequence of possible values presented to the user in turn by operation of the cursor keys on the keypad 24. When the required option is displayed the user selects it by depressing the Enter key. The new configuration settings are stored in a Static RAM 84 which is battery-backed up since this SRAM must be able to retain information when power to the device is switched off. A ROM could alternatively be used to store the settings. The CPU 80 controls the contents of the alphanumeric display 82 in response to the inputs from the keypad 24 in an essentially conventional way which will not be described further in detail.

A ROM 86 stores the operating programme for the CPU. For some designs of the CPU, e.g. where it is a microcontroller, the operating programme may be stored within memory integral within the CPU itself. The RAM 84 also serves to store the incoming text data from the input port 4. Where the data is input via a CENTRONIX (Trade Mark) input port 4A it is held in a data latch 88 until it is subsequently read by the CPU. When the data has been processed, depending on the mode of operation and the configuration of the system, the data will be output to one or more of the output ports 18A, 19A, 44A to the associated printers.

It will be appreciated that the programme under which the CPU operates carries out all the previously described functions of recognising the control codes and selecting the part of the data to be output with an appropriately modified format to the auxiliary output ports depending upon the operation mode selected.

The advantages of using a CPU in order to perform the data flow control functions are that the operator can be given far greater control over the configuration of the device. It will be appreciated that it is relatively easy to modify the programme variables in order to accommodate both standard and non-standard makes of printer enabling the user to select the name of the main printer which it is desired to use with the device while the device is int he user programming mode using the matrix keypad 24.

The device described may be used to output the selected part of the text data to an auxiliary printer not only in normal text form in order to print an address on an envelope but also in the form of a Bar Code representation of the address or part of the address. Such a Bar Code can be generated under CPU control from the address data identified by the control codes and output to an auxiliary printer which is switched to the graphics mode in order to print the Bar Code on an envelope or label. Since Bar Codes can be read more readily than normal type by machines, the option of printing the address in this form would facilitate automated sorting by postal authorities. The option of printing a Bar Code in addition to the normal address on the envelope can be added as a further mode of operation to those discussed with reference to FIG. 2. When this option is enabled the device will function as previously described. However, when the address has been printed, the device will put the selected auxiliary printer into graphics mode and send the appropriate codes to cause the printer to print a Bar Code representing the address data at a desired position on the label or envelope. Since some addresses are extremely long, one possibility would be to Bar Code only the last two lines of the address. These last two lines should include the town or country with the relevant post code or zip code of the destination.

Although the present printer control device has been described in relation to the identification of address data for printing on an auxiliary printer, it will be appreciated that any part of the input text data can be identified by the control codes for separate printing.

We claim:

1. A dedicated printer control device (2) comprising at least one input port (2, 4, 6, 8, 10) for receiving text data, a first output port (18) for connection to a printer on which the text data is to be printed; means (24, 60) for designating characters as control codes identifying the beginning and end respectively of a part of the data, which part is to be separately printed, means (42, 54, 80) for recognising the or each control code in the input text data, user operable selection means (64, 80) for selectively directing the identified part of the text data to a second or third printer output port (19, 44) for the said separate printing, and means (66, 64, 80) for modifying the format of the said part of the text data applied to the second or third output port (19, 44), whereby the device (2) is operable automatically to feed all of the text data to be printed, including the said part, to the first output port for a first printing operation, and the said part to the second or third output ports for a separate, second printing operation.

2. A device as claimed in claim 1, wherein the device is housed within a printer (22).

3. A device as claimed in claim 1, wherein the designating means comprises a keypad (24).

4. A device as claimed in claim 1, further comprising a memory (60, 84) for storing the or each designated control code.

5. A device as claimed in claim 1, further comprising means (80) for stripping said control codes from the text data applied to the output ports.

6. A device as claimed in claim 1, further comprising mode setting means (24) for determining the data to be applied to each output port.

7. A device as claimed in claim 1, wherein the recognising and transmitting means for controlling flow of data from the input to each output port comprise a programmed microprocessor (80).

8. A device as claimed in claim 7, further comprising means for converting at least a portion of said part of the text data into bar code form and transmitting the bar code form of the data to an output port (18, 19, 44).

9. A device as claimed in claim 1, wherein the recognising means comprises a look up table (42) stored in ROM for receiving and comparing the text data character by character with the designated control codes.

10. A dedicated printer control device (2) for use with a computer system comprising means (12) for outputting text data and at least two printers (16, 21, 22), the device (2) having an input port (4, 6, 8, 10) for receiving said text data and respective output ports (18, 19) for connection to the two or more printers (16, 21, 22), the device further comprising means (42, 54, 64, 80) for recognising control codes in the input text data identifying the beginning and end respectively of a part of the text data to be separately printed and, in response to recognition thereof, transmitting the text data to one or both or more of said printer output ports in similar and/or selectively modified formats concurrently on different output ports, the device being arranged, in at least one of its modes of operation, automatically to feed all of the text data to be printed, including the said part, to one of the output ports, for a first printing operation, and the said part to another of the output ports for a separate second printing operation.

11. A dedicated printer control device comprising at least one input port for receiving text data and output port means for connection to a printer on which the text data is to be printed, means for designating characters as control codes identifying the beginning and end respectively of a part of the data, which part is to be separately printed, means for recognising the or each control code in the input text data, user operable selection means for selectively directing the identified part of the text data separately to the output port means for the said separate printing, and means for modifying the format of the said part of the text data directed for the said separate printing, whereby the device is operable to output al of the text data to be printed, including the said part, for a first printing operation, and the said part for a separate, second printing operation.

12. A device as claimed in claim 11, wherein the device is housed within a printer.

13. A device as claimed in claim 11, wherein the designating means comprises a keyboard.

14. A device as claimed in claim 11, further comprising a memory for storing the or each designated control code.

15. A device as claimed in claim 11, further comprising means for stripping said control codes from the text data applied to the output port means.

16. A device as claimed in claim 11, further comprising mode setting means for determining the data to be applied to output port means.

17. A device as claimed in claim 11, wherein the recognising and transmitting means for controlling flow of data from the input port to the output port means comprise a programmed microprocessor.

18. A device as claimed in claim 17, further comprising means for converting at least a portion of said part of the text data into bar code form and transmitting the bar code form of the data to the output port means.

19. A device as claimed in claim 11, wherein the recognising means comprises a look up table stored in ROM for receiving and comparing the text data character by character with the designated control codes.

20. A device as claimed in claim 11, wherein the output port means comprises a first output port for connection to said printer, and second or third printer output ports for receiving said separately transmitted part of the data.

21. A dedicated printer control device for use with a computer system, comprising means for outputting text data and at least one printer, the device having an input port for receiving the text data and at least one respective output port for connection to the printer, the device further comprising means for recognising control codes in the input data identifying the beginning and end respectively of a part of the text data to be separately printed and, in response to the recognition thereof, transmitting the text data separately to the said port or ports in similar and/or selectively modified formats, the device being arranged, in at least one of its modes of operation, automatically to feed to the port or ports all of the text data to be printed, including the said part, for a first printing operation, and the said part for a separate, second printing operation.

22. A device as claimed in claim 21 having at least two printer output ports, wherein the identifying and transmitting means are operable to transmit the text data separately and concurrently on different ones of the output ports.

* * * * *